(12) United States Patent
Meyvaert

(10) Patent No.: US 11,342,844 B1
(45) Date of Patent: May 24, 2022

(54) CIRCUITS FOR DC VOLTAGE CONVERTERS

(71) Applicant: Lion Semiconductor Inc., San Francisco, CA (US)

(72) Inventor: Hans Meyvaert, Leuven (BE)

(73) Assignee: Lion Semiconductor Inc., San Francisco, CA (US)

( * ) Notice: Subject to any disclaimer, the term of this patent is extended or adjusted under 35 U.S.C. 154(b) by 0 days.

(21) Appl. No.: 17/212,651

(22) Filed: Mar. 25, 2021

(51) Int. Cl.
*H02M 3/158* (2006.01)
*H02J 1/08* (2006.01)
*G05F 1/613* (2006.01)
*H02M 1/00* (2006.01)

(52) U.S. Cl.
CPC ............ *H02M 3/158* (2013.01); *G05F 1/613* (2013.01); *H02J 1/082* (2020.01); *H02M 1/009* (2021.05)

(58) Field of Classification Search
CPC ......... H02J 1/082; G05F 1/613; H02M 3/158; H02M 3/1584; H02M 3/18; H02M 3/077; H02M 3/07; H02M 1/009
See application file for complete search history.

(56) References Cited

U.S. PATENT DOCUMENTS

| | | | | | |
|---|---|---|---|---|---|
| 5,729,163 | A | * | 3/1998 | McCleary | H02M 3/07 327/104 |
| 2006/0244513 | A1 | * | 11/2006 | Yen | H02M 3/07 327/536 |
| 2015/0280696 | A1 | * | 10/2015 | Bernacchia | H03K 5/007 327/307 |

* cited by examiner

*Primary Examiner* — Nguyen Tran
(74) *Attorney, Agent, or Firm* — Byrne Poh LLP

(57) ABSTRACT

Circuit comprising: a first switch (1S) having: a first side (FS) connected to an input node (IN); and a second side (SS); a first capacitor (FC) having: FS connected to SS of 1S; and SS; a second switch having: FS connected to SS of FC; and SS connected to a voltage level node; a third switch having: FS connected to SS of FC; and SS connected to a voltage output node; a fourth switch (4S) having: FS connected to IN; and SS; a second capacitor (SC) having: FS connected to SS of 4S; and SS; a fifth switch having: FS connected to SS of SC; and SS connected to the voltage level node; a sixth switch having: FS connected to SS of SC; and SS connected to the voltage output node; a first connection node connected to FS of FC; and a second connection node connected to FS of SC.

3 Claims, 15 Drawing Sheets

CIRCUITS FOR DC VOLTAGE CONVERTERS

BACKGROUND

DC voltage converters are widely used for a variety of applications. For example, DC voltage converters can be used to provide DC voltage regulators, provide DC-to-DC converters, and provide battery chargers (such as with mobile telephones and other mobile devices).

Accordingly, new circuits for DC voltage converters are desirable.

SUMMARY

In accordance with some embodiments, circuits for DC voltage converters are provided.

In some embodiments, circuits are provided, the circuits comprising: a first block comprising: an input node; a first switch having: a first side connected to the input node; and a second side; a first capacitor having: a first side connected to the second side of the first switch; and a second side; a second switch having: a first side connected to the second side of the first capacitor; and a second side connected to a voltage level node; a third switch having: a first side connected to the second side of the first capacitor; and a second side connected to a voltage output node; a fourth switch having: a first side connected to the input node; and a second side; a second capacitor having: a first side connected to the second side of the fourth switch; and a second side; a fifth switch having: a first side connected to the second side of the second capacitor; and a second side connected to the voltage level node; a sixth switch having: a first side connected to the second side of the second capacitor; and a second side connected to the voltage output node; a first connection node connected to the first side of the first capacitor; and a second connection node connected to the first side of the second capacitor; a second block comprising: a third connection node connected to the first connection node; a fourth connection node connected to the second connection node; a seventh switch having: a first side connected to the third connection node; and a second side; a third capacitor having: a first side connected to the second side of the seventh switch; and a second side; an eighth switch having: a first side connected to the second side of the third capacitor; and a second side connected to the voltage level node; a ninth switch having: a first side connected to the second side of the third capacitor; and a second side connected to the voltage output node; a tenth switch having: a first side connected to the fourth connection node; and second side; a fourth capacitor having: a first side connected to the second side of the tenth switch; and a second side; an eleventh switch having: a first side connected to the second side of the fourth capacitor; and a second side connected to the voltage level node; a twelfth switch having: a first side connected to the second side of the fourth capacitor; and a second side connected to the voltage output node; a thirteenth switch having: a first side connected to the first side of the tenth switch; and a second side connected to the second side of the seventh switch; a fourteenth switch having: a first side connected to the first side of the seventh switch; and a second side connected to the second side of the tenth switch; a fifth connection node connected to the first side of the third capacitor; and a sixth connection node connected to the first side of the fourth capacitor; a third block comprising: a fifteenth switch having: a first side coupled to the fifth connection node; and a second side connected to the voltage output node; and a sixteenth switch having: a first side coupled to the sixth connection node; and a second side connected to the voltage output node.

In some of these embodiments, the first side of the fifteenth switch is coupled to the fifth connection node by a first connection; and the first side of the sixteenth switch is coupled to the sixth connection node by a second connection.

In some of these embodiments, the circuit further comprises: a fourth block comprising: a seventh connection node connected to the fifth connection node; a eighth connection node connected to the sixth connection node; a seventeenth switch having: a first side connected to the seventh connection node; and a second side; a fifth capacitor having: a first side connected to the second side of the seventeenth switch; and a second side; an eighteenth switch having: a first side connected to the second side of the fifth capacitor; and a second side connected to the voltage level node; a nineteenth switch having: a first side connected to the second side of the fifth capacitor; and a second side connected to the voltage output node; a twentieth switch having: a first side connected to the eighth connection node; and second side; a sixth capacitor having: a first side connected to the second side of the twentieth switch; and a second side; a twenty-first switch having: a first side connected to the second side of the sixth capacitor; and a second side connected to the voltage level node; a twenty-second switch having: a first side connected to the second side of the sixth capacitor; and a second side connected to the voltage output node; a twenty-third switch having: a first side connected to the first side of the twentieth switch; and a second side connected to the second side of the seventeenth switch; a twenty-fourth switch having: a first side connected to the first side of the seventeenth switch; and a second side connected to the second side of the twentieth switch; a ninth connection node connected to the first side of the fifth capacitor and to the first side of the fifteenth switch; and a tenth connection node connected to the first side of the sixth capacitor and to the first side of the sixteenth switch.

DETAILED DESCRIPTION

Figure 1:
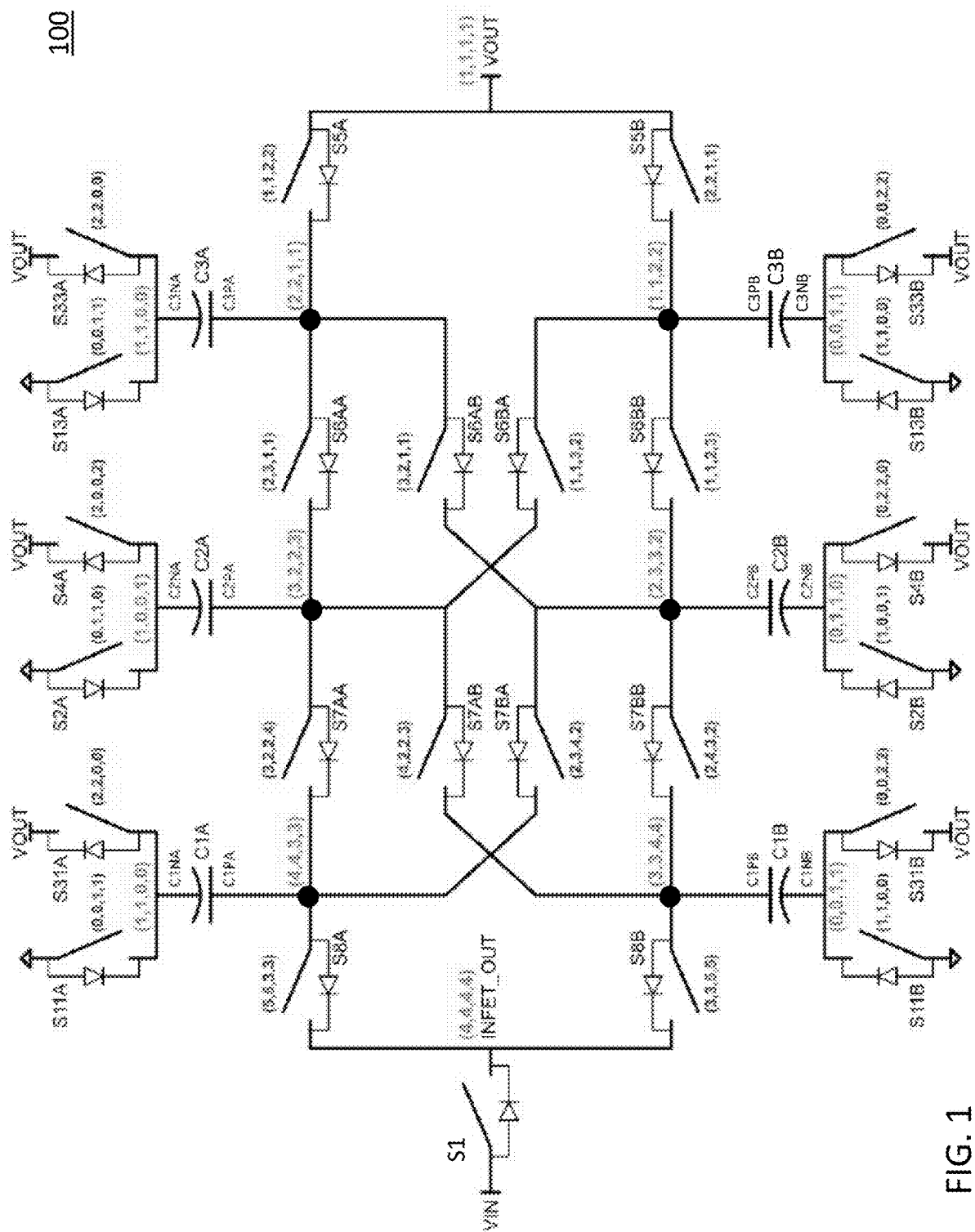
FIG. 1 is an example of a schematic of a 4:1 DC voltage converter in accordance with some embodiments.

In accordance with some embodiments, DC voltage converters are provided. These DC voltage converters can be used for any suitable purpose in some embodiments. For example, in some embodiments, these DC voltage converters can be used to implement voltage regulators, to implement DC-to-DC converters, to implement battery chargers, and/or for any other suitable purpose.

As illustrated herein, 4:1, 3:1, and 2:1 DC voltage converters can be implemented using the circuits shown in FIGS. 1-14 in accordance with some embodiments. The voltage output from these circuits can be provided by the following equation:

$$VOUT = \frac{VIN}{N} - V_\Delta$$

where VOUT is the output voltage at the output nodes, VIN is the input voltage at the input node, N is 2, 3, or 4 based on whether a circuit is being used to implement a 2:1, 3:1, or 4:1 DC voltage converter, and $V_A$ is a small voltage ranging from 0.01% to 10% of VOUT because larger voltage leads to more inefficiencies.

Turning to FIGS. 1-5, an example 100 of a 4:1 DC voltage converter in accordance with some embodiments is illustrated. As shown, voltage converter 100 includes switches S1, S11A, S31A, S2A, S4A, S13A, S33A, S8A, S7AA, S6AA, S5A, S7AB, S7BA, S6AB, S6BA, S8B, S7BB, S6BB, S5B, S11B, S31B, S2B, S4B, S13B, and S33B (each of which can have an inherent diode (as shown) based on the process technology used in some embodiments) and capacitors C1A, C2A, C3A, C1B, C2B, and C3B.

Any suitable switches can be used as switches S1, S11A, S31A, S2A, S4A, S13A, S33A, S8A, S7AA, S6AA, 55A, S7AB, S7BA, S6AB, S6BA, S8B, S7BB, S6BB, S5B, S11B, S31B, S2B, S4B, S13B, and S33B, and all of these switches need not be of the same type, in some embodiments. For example, in some embodiments, these switches can be formed from N-type MOSFETs or P-type MOSFETs.

S1 can be used to perform a variety of functions in some embodiments. For example, in some embodiments, S1, when on, can be used as a resistor to measure the amount of current flowing from VIN. As another example, S1 can be used to protect the entire converter against certain over voltage or over current events by turning S1 OFF to prevent damage of the converter. In some embodiments, S1 can be omitted when not needed or desirable.

Any suitable capacitors, of any suitable size, can be used as capacitors C1A, C2A, C3A, C1B, C2B, and C3B, and all of these capacitors need not be of the same type or size, in some embodiments. For example, in some embodiments, these capacitors can be formed from Multi-Layer Ceramic Capacitors (MLCC) or on-chip MOS capacitors, and can be in the range of 1 nF to 1 mF, depending on the output power specification (higher output power requires larger capacitance values).

As shown, a voltage input VIN is provided on the left side of the schematic for voltage converter 100, and seven outputs VOUT are shown along the top, right, and bottom of the schematic for voltage converter 100. It should be understood that each of the seven outputs VOUT in each of FIGS. 1-5 are connected together.

As shown in FIG. 1, there are six path intersections immediately to the right of switches S8A, S7AA, S6AA, S8B, S7BB, and S6BB (each shaped like a +). To clarify that these intersections connect the horizontal paths and the vertical paths, a black circle is shown over the intersection. By contrast, the path intersection immediately to the left of switches S7AB and S7BA (shaped like an X) and the path intersection immediately to the left of switches S6AB and S6BA (also shaped like an X) do not have black circles to indicate the downward path (when moving from left to right) does not connect to the upward path (when moving from left to right).

During operation, voltage converter 100 can switch sequentially through four phases ρ1-ρ4, which are respectively shown in FIGS. 2-5. In some embodiments, voltage converter 100 can switch from phase ρ1 to phase ρ2, from phase ρ2 to phase ρ3, from phase ρ3 to phase ρ4, and from phase ρ4 to phase ρ1 after any suitable period (e.g., in the range of one nanosecond to one millisecond), and these periods between each of these transitions need not be the same. Any given phase (e.g., phase ρ1, ρ2, ρ3, or ρ4) can begin (or end) at any suitable frequency in some embodiments. For example, in some embodiments, this frequency can be in the range of 1 kHz to 1 GHz.

During operation, the switches in converter 100 can be driven ON or OFF during each of phases ρ1-ρ4 as shown in TABLE 1 below. Any suitable drive signals can be used to control the switches to be ON or OFF during any phase. For example, in some embodiments, when the switches are implemented using N-type MOSFETs, the switches can be driven by drive signals having values equal to the voltage multipliers shown after the colon (":") in TABLE 1 multiplied by the value of VOUT. For example, if VOUT is 1 volt, switch S31A can be driven by a 2 volts DC signal during phase ρ1. As another example, if VOUT is 2 volts DC, switch S8A can be driven by a 10 volts DC signal during phase ρ2. While specific voltage multipliers are shown in TABLE 1, it should be understood that other voltages are possible in some embodiments.

TABLE 1

| Switch | ρ1 | ρ2 | ρ3 | ρ4 |
| --- | --- | --- | --- | --- |
| S1 | ON:5 | ON:5 | ON:5 | ON:5 |
| S11A | OFF:0 | OFF:0 | ON:1 | ON:1 |
| S31A | ON:2 | ON:2 | OFF:0 | OFF:0 |
| S2A | OFF:0 | ON:1 | ON:1 | OFF:0 |
| S4A | ON:2 | OFF:0 | OFF:0 | ON:2 |
| S13A | OFF:0 | OFF:0 | ON:1 | ON:1 |
| S33A | ON:2 | ON:2 | OFF:0 | OFF:0 |
| S8A | ON:5 | ON:5 | OFF:3 | OFF:3 |
| S7AA | OFF:3 | OFF:2 | OFF:2 | ON:4 |

TABLE 1-continued

| Switch | ρ1 | ρ2 | ρ3 | ρ4 |
|---|---|---|---|---|
| S6AA | OFF:2 | ON:3 | OFF:1 | OFF:1 |
| S5A | OFF:1 | OFF:1 | ON:2 | ON:2 |
| S7AB | ON:4 | OFF:2 | OFF:2 | OFF:3 |
| S7BA | OFF:2 | OFF:3 | ON:4 | OFF:2 |
| S6AB | ON:3 | OFF:2 | OFF:1 | OFF:1 |
| S6BA | OFF:1 | OFF:1 | ON:3 | OFF:2 |
| S8B | OFF:3 | OFF:3 | ON:5 | ON:5 |
| S7BB | OFF:2 | ON:4 | OFF:3 | OFF:2 |
| S6BB | OFF:1 | OFF:1 | OFF:2 | ON:3 |
| S5B | ON:2 | ON:2 | OFF:1 | OFF:1 |
| S11B | ON:1 | ON:1 | OFF:0 | OFF:0 |
| S31B | OFF:0 | OFF:0 | ON:2 | ON:2 |
| S2B | ON:1 | OFF:0 | OFF:0 | ON:1 |
| S4B | OFF:0 | ON:2 | ON:2 | OFF:0 |
| S13B | ON:1 | ON:1 | OFF:0 | OFF:0 |
| S33B | OFF:0 | OFF:0 | ON:2 | ON:2 |

TABLE 2 shows example multiples of VOUT that can be observed at the various nodes in converter 100 during different phases of operation in some embodiments. For example, for a VOUT of 2 volts DC, a voltage of 2 volts DC can be observed during phase ρ1 at node C1NA, in some embodiments. As another example, for a VOUT of 1 volt DC, a voltage of 4 volts DC can be observed during phase ρ1 at node C1PA, in some embodiments. While specific voltage multipliers are shown in TABLE 2, it should be understood that other voltages are possible in some embodiments.

TABLE 2

| Node | ρ1 | ρ2 | ρ3 | ρ4 |
|---|---|---|---|---|
| C1NA | 1 | 1 | 0 | 0 |
| C2NA | 1 | 0 | 0 | 1 |
| C3NA | 1 | 1 | 0 | 0 |
| C1PA | 4 | 4 | 3 | 3 |
| C2PA | 3 | 2 | 2 | 3 |
| C3PA | 2 | 2 | 1 | 1 |
| INFET_OUT | 4 | 4 | 4 | 4 |
| C1PB | 3 | 3 | 4 | 4 |
| C2PB | 2 | 3 | 3 | 2 |
| C3PB | 1 | 1 | 2 | 2 |
| C1NB | 0 | 0 | 1 | 1 |
| C2NB | 0 | 1 | 1 | 0 |
| C3NB | 0 | 0 | 1 | 1 |

Turning to FIGS. 2-5, illustrations of the current flow during each of phases ρ1-ρ4 are shown in accordance with some embodiments. The arrows represent current flowing through closed switches consistent with TABLE 1. Switches with no arrows going through them are open consistent with TABLE 1.

Figure 2:
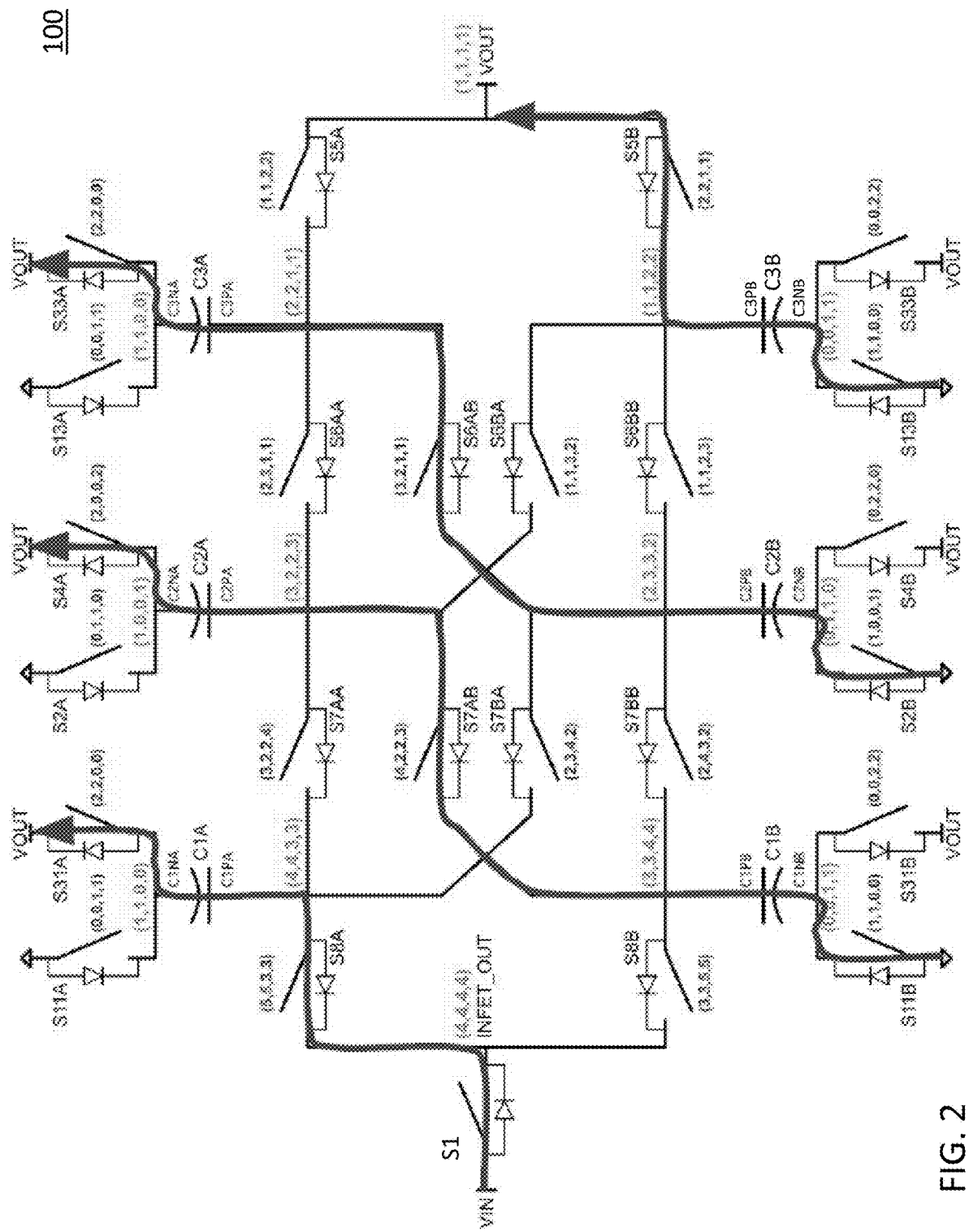
FIG. 2 is an illustration of current flow during a first phase of the operation of the 4:1 DC voltage converter of FIG. 1 in accordance with some embodiments.

As shown in FIG. 2, during phase ρ1, four current flows are illustrated. First, current flows from VIN through S1, S8A, C1A, and S31A to VOUT. Second, current flows from ground, through S11B, C1B, S7AB, C2A, and S4A to VOUT. Third, current flows from ground, through S2B, C2B, S6AB, C3A, and S33A to VOUT. And fourth, current flows from ground, through S13B, C3B, and S5B to VOUT.

Figure 3:
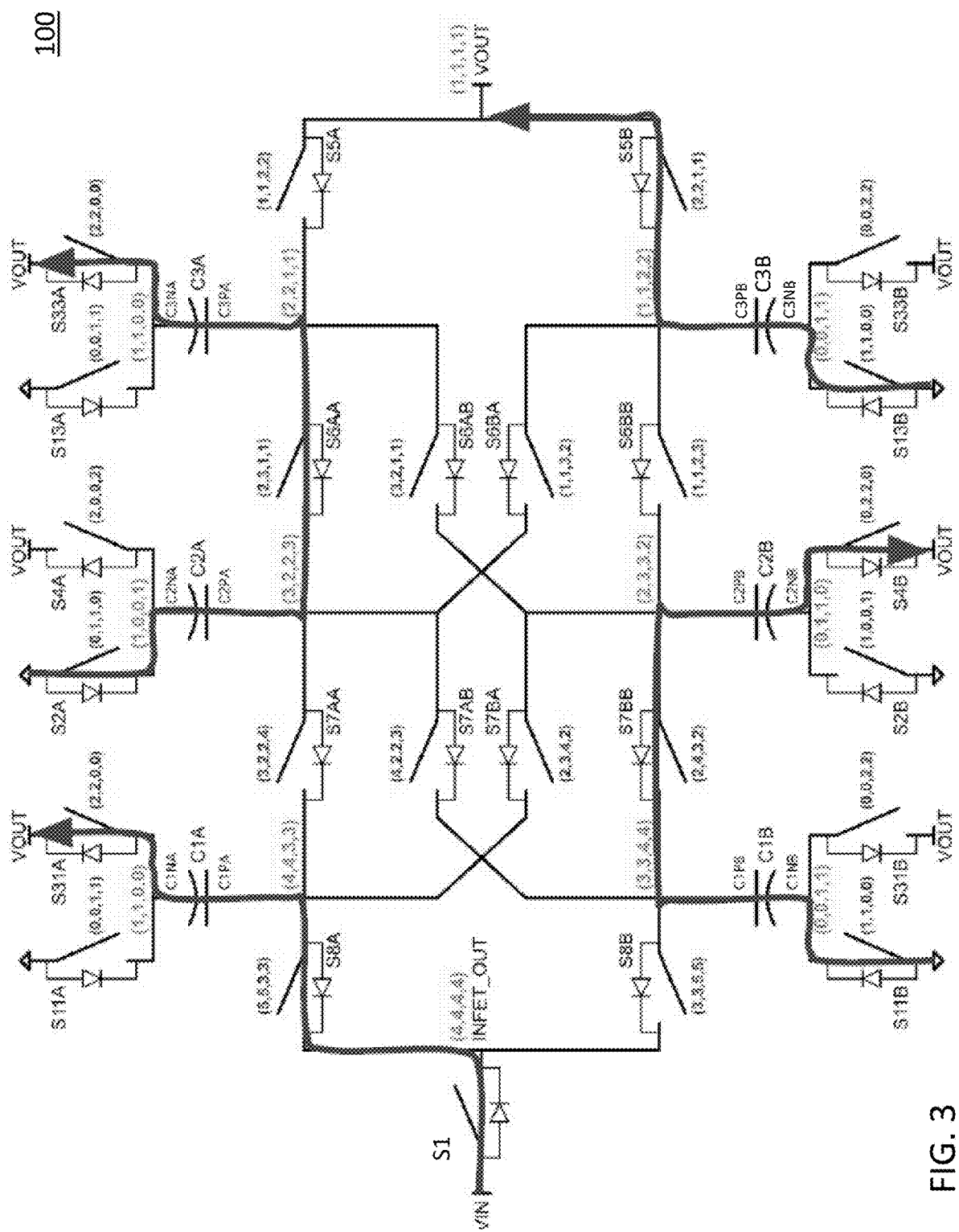
FIG. 3 is an illustration of current flow during a second phase of the operation of the 4:1 DC voltage converter of FIG. 1 in accordance with some embodiments.

As shown in FIG. 3, during phase ρ2, four current flows are illustrated. First, current flows from VIN through S1, S8A, C1A, and S31A to VOUT. Second, current flows from ground, through S2A, C2A, S6AA, C3A, and S33A to VOUT. Third, current flows from ground, through S11B, C1B, S7BB, C2B, and S4B to VOUT. And fourth, current flows from ground, through S13B, C3B, and S5B to VOUT.

Figure 4:
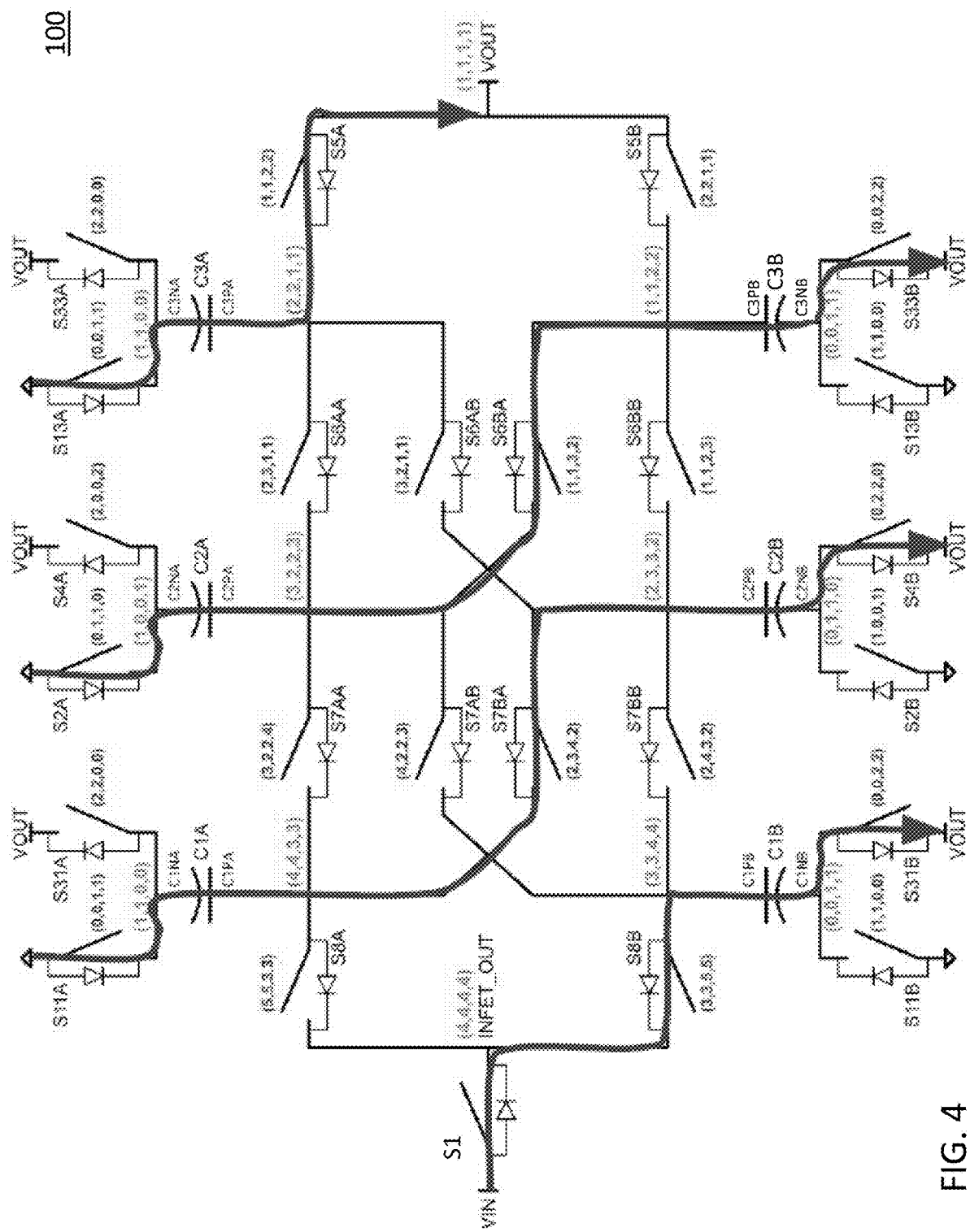
FIG. 4 is an illustration of current flow during a third phase of the operation of the 4:1 DC voltage converter of FIG. 1 in accordance with some embodiments.

As shown in FIG. 4, during phase ρ3, four current flows are illustrated. First, current flows from VIN through S1, S8B, C1B, and S31B to VOUT. Second, current flows from ground, through S11A, C1A, S7BA, C2B, and S4B to VOUT. Third, current flows from ground, through S2A, C2A, S6BA, C3B, and S33B to VOUT. And fourth, current flows from ground, through S13A, C3A, and S5A to VOUT.

Figure 5:
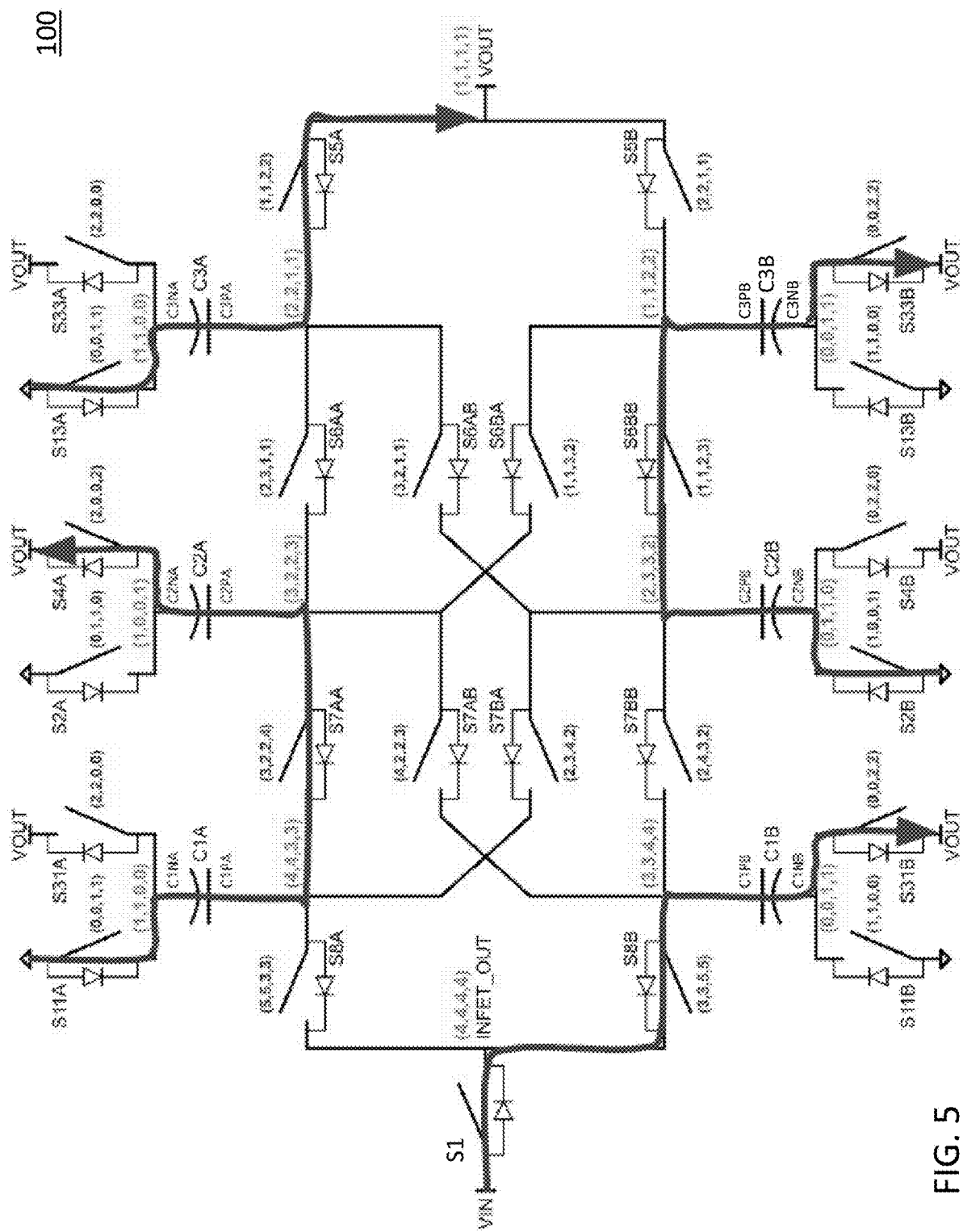
FIG. 5 is an illustration of current flow during a fourth phase of the operation of the 4:1 DC voltage converter of FIG. 1 in accordance with some embodiments.
Figure 6:
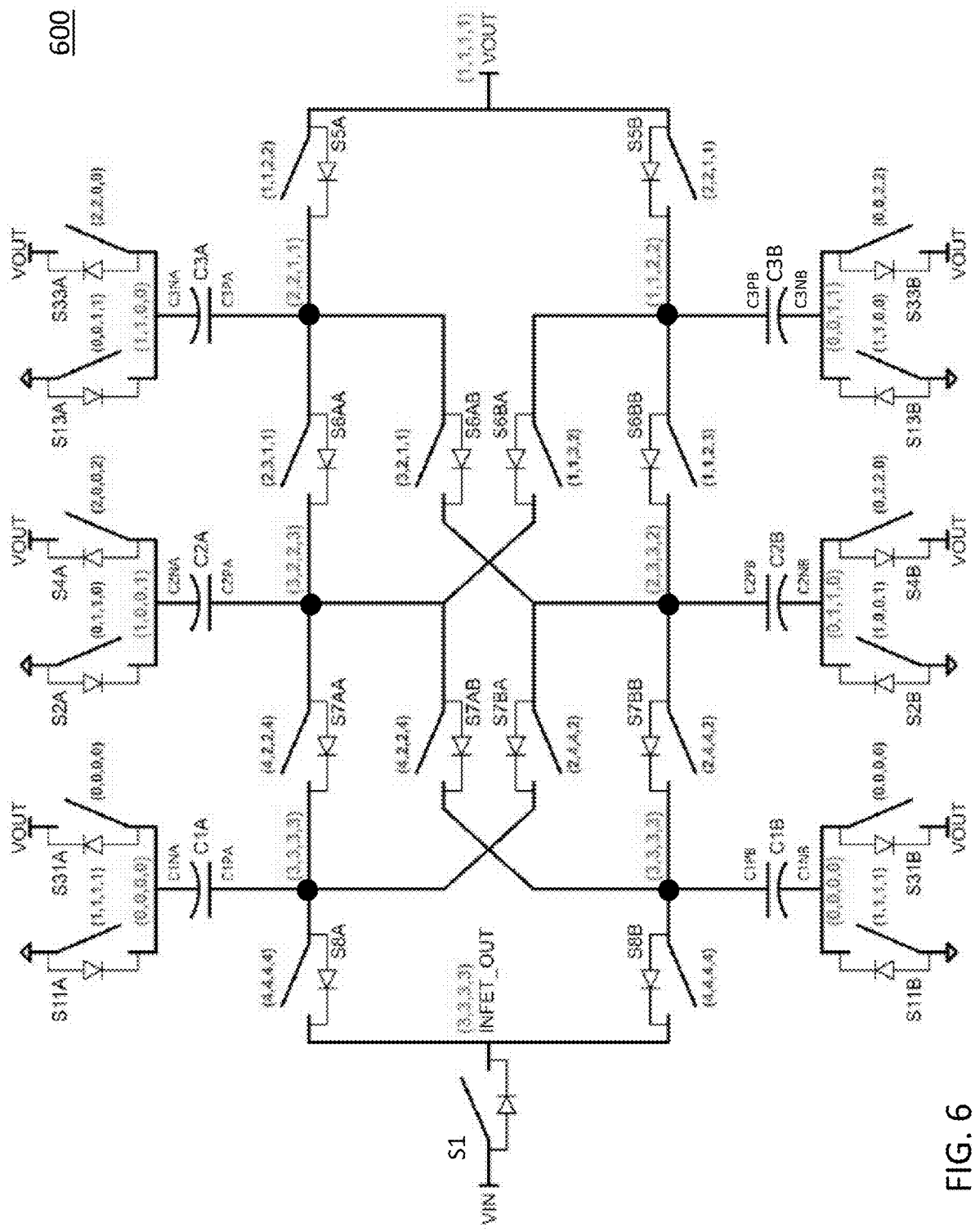
FIG. 6 is an example of a schematic of a 3:1 DC voltage converter in accordance with some embodiments.

As shown in FIG. 5, during phase ρ4, four current flows are illustrated. First, current flows from VIN through S1, S8B, C1B, and S31B to VOUT. Second, current flows from ground, through S11A, C1A, S7AA, C2A, and S4A to VOUT. Third, current flows from ground, through S2B, C2B, S6BB, C3B, and S33B to VOUT. And fourth, current flows from ground, through S13A, C3A, and 55A to VOUT.

Turning to FIGS. 6-10, an example 600 of a 3:1 DC voltage converter in accordance with some embodiments is illustrated. As shown, like converter 100, converter 600 includes switches S1, S11A, S31A, S2A, S4A, S13A, S33A, S8A, S7AA, S6AA, 55A, S7AB, S7BA, S6AB, S6BA, S8B, S7BB, S6BB, S5B, S11B, S31B, S2B, S4B, S13B, and S33B (each of which can have an inherent diode (as shown) based on the process technology used in some embodiments) and capacitors C1A, C2A, C3A, C1B, C2B, and C3B.

As shown, in some embodiments, circuits 600 and 100 share the same components. As such, by controlling the states of the switches during the switching phases, a circuit 600 or 100 can be reconfigured to operate as a 3:1 converter or a 4:1 converter, respectively, in some embodiments, Any suitable switches can be used as switches S1, S11A, S31A, S2A, S4A, S13A, S33A, S8A, S7AA, S6AA, 55A, S7AB, S7BA, S6AB, S6BA, S8B, S7BB, S6BB, S5B, S11B, S31B, S2B, S4B, S13B, and S33B, and all of these switches need not be of the same type, in some embodiments. For example, in some embodiments, these switches can be formed from N-type MOSFETs or P-type MOSFETs.

S1 can be used to perform a variety of functions in some embodiments. For example, in some embodiments, S1, when on, can be used as a resistor to measure the amount of current flowing from VIN. As another example, S1 can be used to protect the entire converter against certain over voltage or over current events by turning S1 OFF to prevent damage of the converter. In some embodiments, S1 can be omitted when not needed or desirable.

Any suitable capacitors, of any suitable size, can be used as capacitors C1A, C2A, C3A, C1B, C2B, and C3B, and all of these capacitors need not be of the same type or size, in some embodiments. For example, in some embodiments, these capacitors can be formed from Multi-Layer Ceramic Capacitors (MLCC) or on-chip MOS capacitors, and can be in the range of 1 nF to 1 mF, depending on the output power specification (higher output power requires larger capacitance values).

As shown, a voltage input VIN is provided on the left side of the schematic for converter 600, and seven outputs VOUT are shown along the top, right, and bottom of the schematic for converter 600. It should be understood that each of the seven outputs VOUT in each of FIGS. 6-10 are connected together.

During operation, converter 600 can switch sequentially through four phases ρ1-ρ4, which are respectively shown in FIGS. 7-10. In some embodiments, voltage converter 600 can switch from phase ρ1 to phase ρ2, from phase ρ2 to phase ρ3, from phase ρ3 to phase ρ4, and from phase ρ4 to phase ρ1 after any suitable period (e.g., in the range of one nanosecond to one millisecond), and these periods between each of these transitions need not be the same. Any given phase (e.g., phase ρ1, ρ2, ρ3, or ρ4) can begin (or end) at any suitable frequency in some embodiments. For example, in some embodiments, this frequency can be in the range of 1 kHz to 1 GHz.

During operation, the switches in converter 600 can be driven ON or OFF during each of phases ρ1-ρ4 as shown in TABLE 3 below. Any suitable drive signals can be used to control the switches to be ON or OFF during any phase. For example, in some embodiments, when the switches are implemented using N-type MOSFETs, the switches can be driven by drive signals having values equal to the voltage multipliers shown after the colon (":") in TABLE 3 multiplied by the value of VOUT. For example, if VOUT is 1 volt, switch S4A can be driven by a 2 volts DC signal during phase ρ1. As another example, if VOUT is 2 volts, switch S7AB can be driven by a 4 volts DC signal during phase ρ2. While specific voltage multipliers are shown in TABLE 3, it should be understood that other voltages are possible in some embodiments.

TABLE 3

| Switch | ρ1 | ρ2 | ρ3 | ρ4 |
|---|---|---|---|---|
| S1 | ON:4 | ON:4 | ON:4 | ON:4 |
| S11A | ON:1 | ON:1 | ON:1 | ON:1 |
| S31A | OFF:0 | OFF:0 | OFF:0 | OFF:0 |
| S2A | OFF:0 | ON:1 | ON:1 | OFF:0 |
| S4A | ON:2 | OFF:0 | OFF:0 | ON:2 |
| S13A | OFF:0 | OFF:0 | ON:1 | ON:1 |
| S33A | ON:2 | ON:2 | OFF:0 | OFF:0 |
| S8A | ON:4 | ON:4 | ON:4 | ON:4 |
| S7AA | ON:4 | OFF:2 | OFF:2 | ON:4 |
| S6AA | OFF:2 | ON:3 | OFF:1 | OFF:1 |
| S5A | OFF:1 | OFF:1 | ON:2 | ON:2 |
| S7AB | ON:4 | OFF:2 | OFF:2 | ON:4 |
| S7BA | OFF:2 | ON:4 | ON:4 | OFF:2 |
| S6AB | ON:3 | OFF:2 | OFF:1 | OFF:1 |
| S6BA | OFF:1 | OFF:1 | ON:3 | OFF:2 |
| S8B | ON:4 | ON:4 | ON:4 | ON:4 |
| S7BB | OFF:2 | ON:4 | ON:4 | OFF:2 |
| S6BB | OFF:1 | OFF:1 | OFF:2 | ON:3 |
| S5B | ON:2 | ON:2 | OFF:1 | OFF:1 |
| S11B | ON:1 | ON:1 | ON:1 | ON:1 |
| S31B | OFF:0 | OFF:0 | OFF:0 | OFF:0 |
| S2B | ON:1 | OFF:0 | OFF:0 | ON:1 |
| S4B | OFF:0 | ON:2 | ON:2 | OFF:0 |
| S13B | ON:1 | ON:1 | OFF:0 | OFF:0 |
| S33B | OFF:0 | OFF:0 | ON:2 | ON:2 |

TABLE 4 shows example multiples of VOUT that can be observed at the various nodes in converter 600 during different phases of operation in some embodiments. For example, for a VOUT of 2 volts DC, a voltage of 2 volts DC can be observed during phase ρ1 at node C2NA, in some embodiments. As another example, for a VOUT of 1 volt DC, a voltage of 3 volts DC can be observed during phase ρ1 at node C1PA, in some embodiments. While specific voltage multipliers are shown in TABLE 4, it should be understood that other voltages are possible in some embodiments.

TABLE 4

| Node | ρ1 | ρ2 | ρ3 | ρ4 |
|---|---|---|---|---|
| C1NA | 0 | 0 | 0 | 0 |
| C2NA | 1 | 0 | 0 | 1 |
| C3NA | 1 | 1 | 0 | 0 |
| C1PA | 3 | 3 | 3 | 3 |
| C2PA | 3 | 2 | 2 | 3 |
| C3PA | 2 | 2 | 1 | 1 |
| INFET_OUT | 3 | 3 | 3 | 3 |
| C1PB | 3 | 3 | 3 | 3 |

TABLE 4-continued

| Node | ρ1 | ρ2 | ρ3 | ρ4 |
|---|---|---|---|---|
| C2PB | 2 | 3 | 3 | 2 |
| C3PB | 1 | 1 | 2 | 2 |
| C1NB | 0 | 0 | 0 | 0 |
| C2NB | 0 | 1 | 1 | 0 |
| C3NB | 0 | 0 | 1 | 1 |

Turning to FIGS. 7-10, illustrations of the current flow during each of phases ρ1-ρ4 are shown in accordance with some embodiments. The arrows represent current flowing through closed switches consistent with TABLE 3. Switches with no arrows going through them are open consistent with TABLE 3.

As shown in each of FIGS. 7-10 by dashed lines (for closed switches only), switches S1, S8A, S8B, S11A, and S11B are ON (closed) and switches S31A and S31B are OFF (open) during all four operational phases (ρ1, ρ2, ρ3, and ρ4) of converter 600 as described below. Keeping switches S1, S8A, S8B, S11A, and S11B ON (closed) and switches S31A and S31B OFF (open) during all four operational phases (ρ1, ρ2, ρ3, and ρ4) effectively removes them from converter 600 during operation. As mentioned above, this allows the circuit of converter 600 to be used to act as a 3:1 converter or a 4:1 converter based on whether S1, S8A, S8B, S11A, S11B, S31A, and S31B are active (as described in connection with FIGS. 1-5) or not (as described in connection with FIGS. 6-10).

Figure 7:
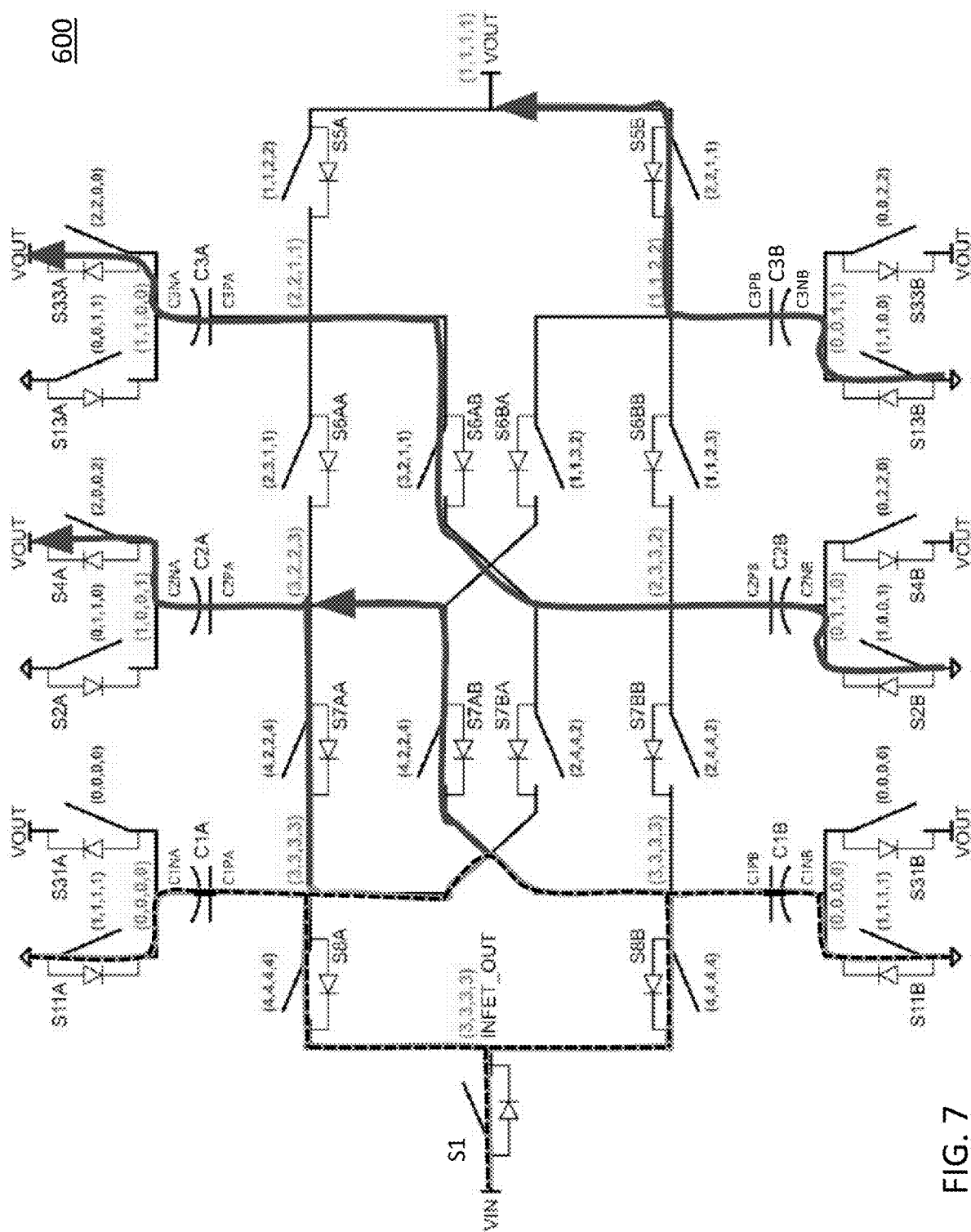
FIG. 7 is an illustration of current flow during a first phase of the operation of the 3:1 DC voltage converter of FIG. 6 in accordance with some embodiments.

As shown in FIG. 7, during phase ρ1, three current flows are illustrated. First, current flows from VIN through S1, S8A and S8B (in parallel), S7AA and S7AB (in parallel), C2A, and S4A to VOUT. Second, current flows from ground, through S2B, C2B, S6AB, C3A, and S33A to VOUT. Third, current flows from ground, through S13B, C3B, and S5B to VOUT.

Figure 8:
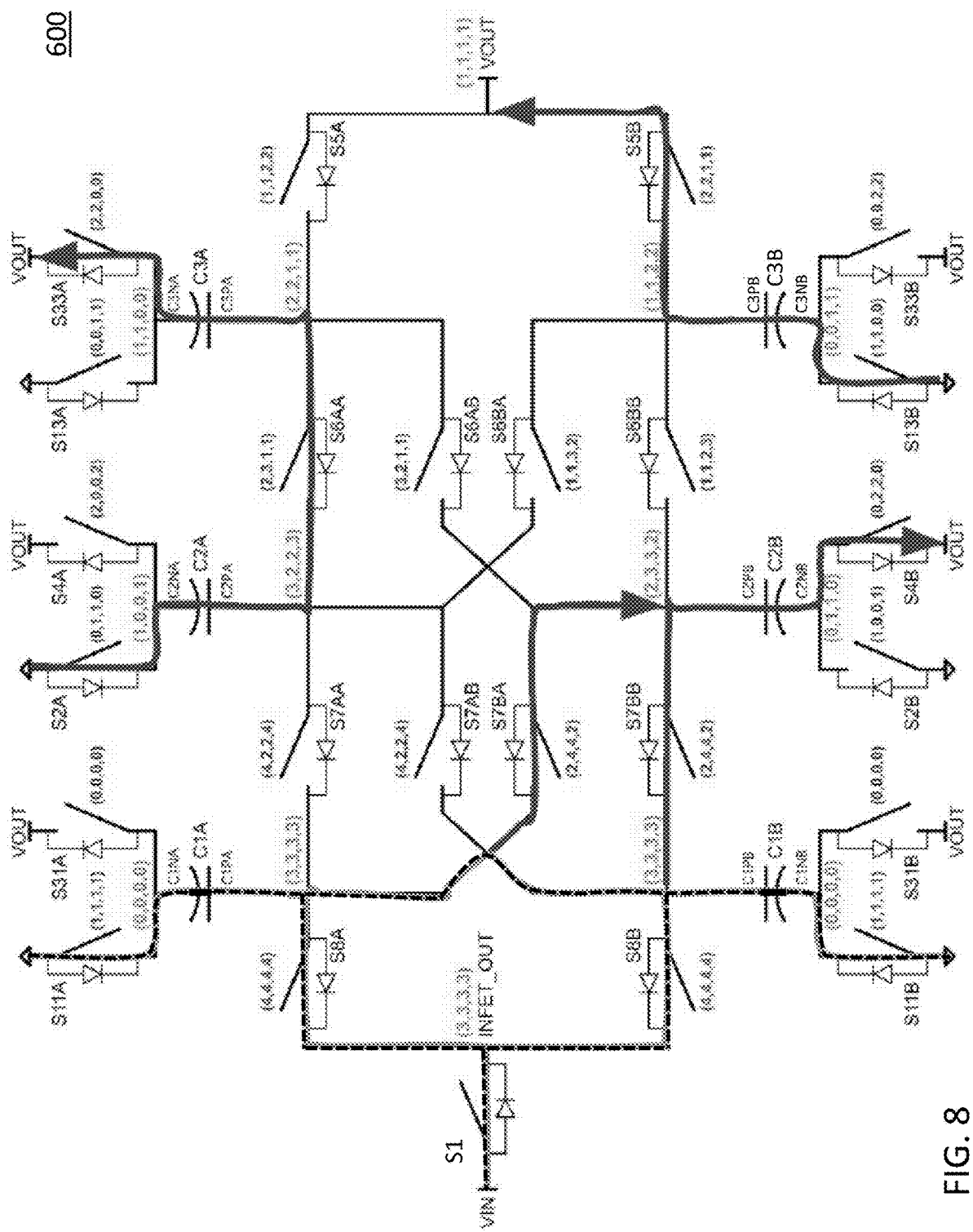
FIG. 8 is an illustration of current flow during a second phase of the operation of the 3:1 DC voltage converter of FIG. 6 in accordance with some embodiments.

As shown in FIG. 8, during phase ρ2, three current flows are illustrated. First, current flows from VIN through S1, S8A and S8B (in parallel), S7BA and S7BB (in parallel), C2B, and S4B to VOUT. Second, current flows from ground, through S2A, C2A, S6AA, C3A, and S33A to VOUT. Third, current flows from ground, through S13B, C3B, and S5B to VOUT.

Figure 9:
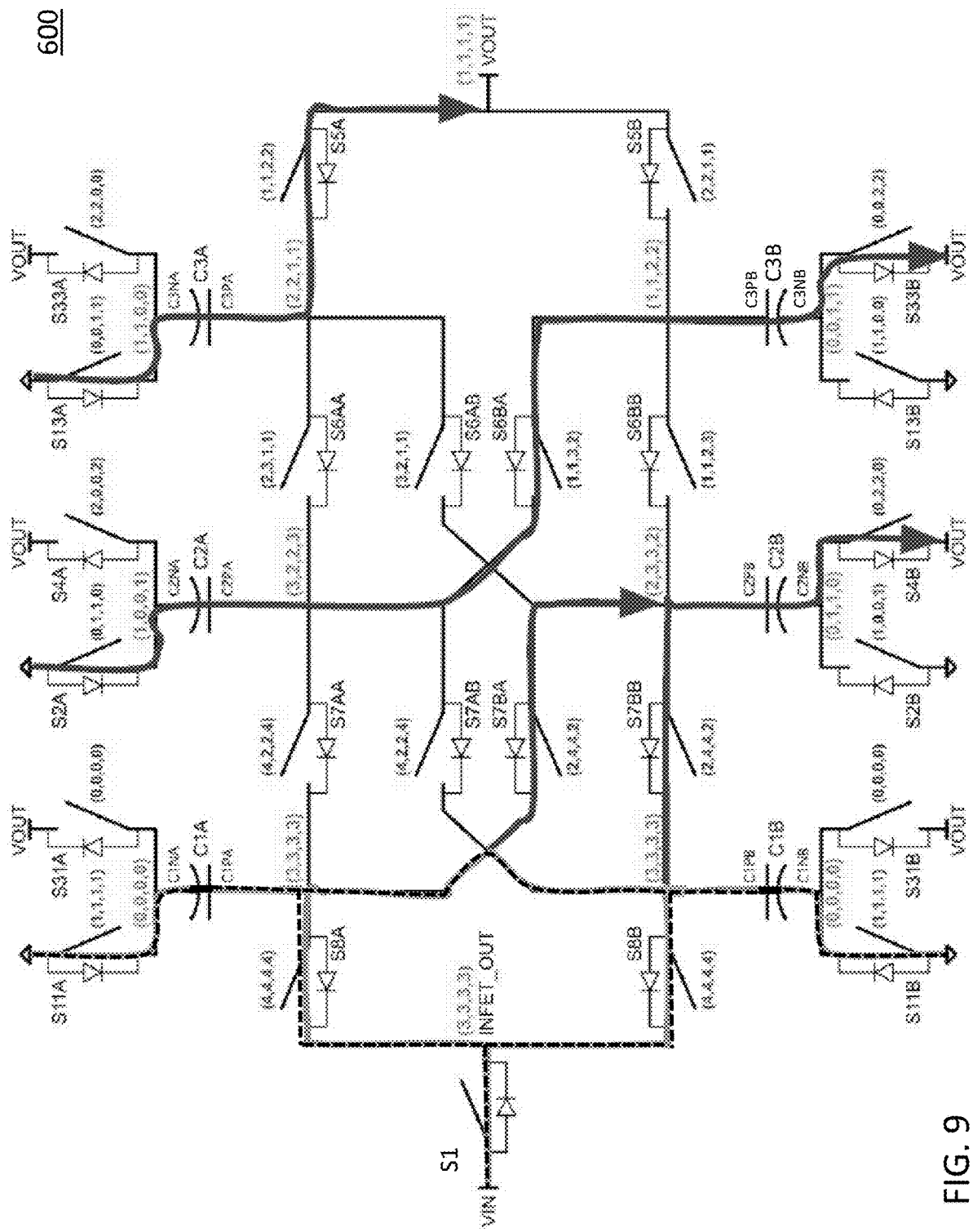
FIG. 9 is an illustration of current flow during a third phase of the operation of the 3:1 DC voltage converter of FIG. 6 in accordance with some embodiments.

As shown in FIG. 9, during phase ρ3, three current flows are illustrated. First, current flows from VIN through S1, S8A and S8B (in parallel), S7BA and S7BB (in parallel), C2B, and S4B to VOUT. Second, current flows from ground, through S2A, C2A, S6BA, C3B, and S33B to VOUT. Third, current flows from ground, through S13A, C3A, and S5A to VOUT.

Figure 10:
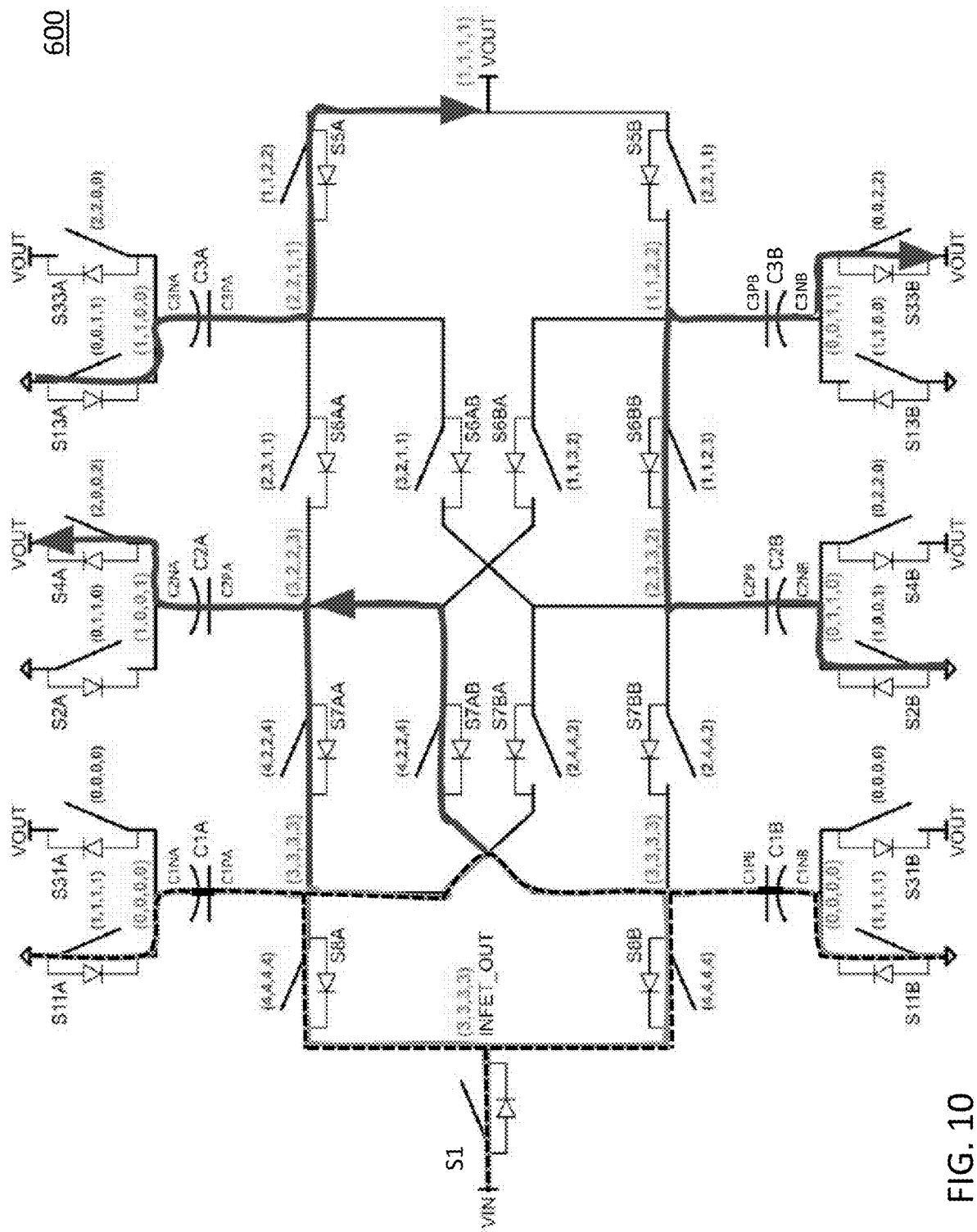
FIG. 10 is an illustration of current flow during a fourth phase of the operation of the 3:1 DC voltage converter of FIG. 6 in accordance with some embodiments.

As shown in FIG. 10, during phase ρ4, three current flows are illustrated. First, current flows from VIN through S1, S8A and S8B (in parallel), S7AA and S7AB (in parallel), C2A, and S4A to VOUT. Second, current flows from ground, through S2B, C2B, S6BB, C3B, and S33B to VOUT. Third, current flows from ground, through S13A, C3A, and 55A to VOUT.

Figure 11:
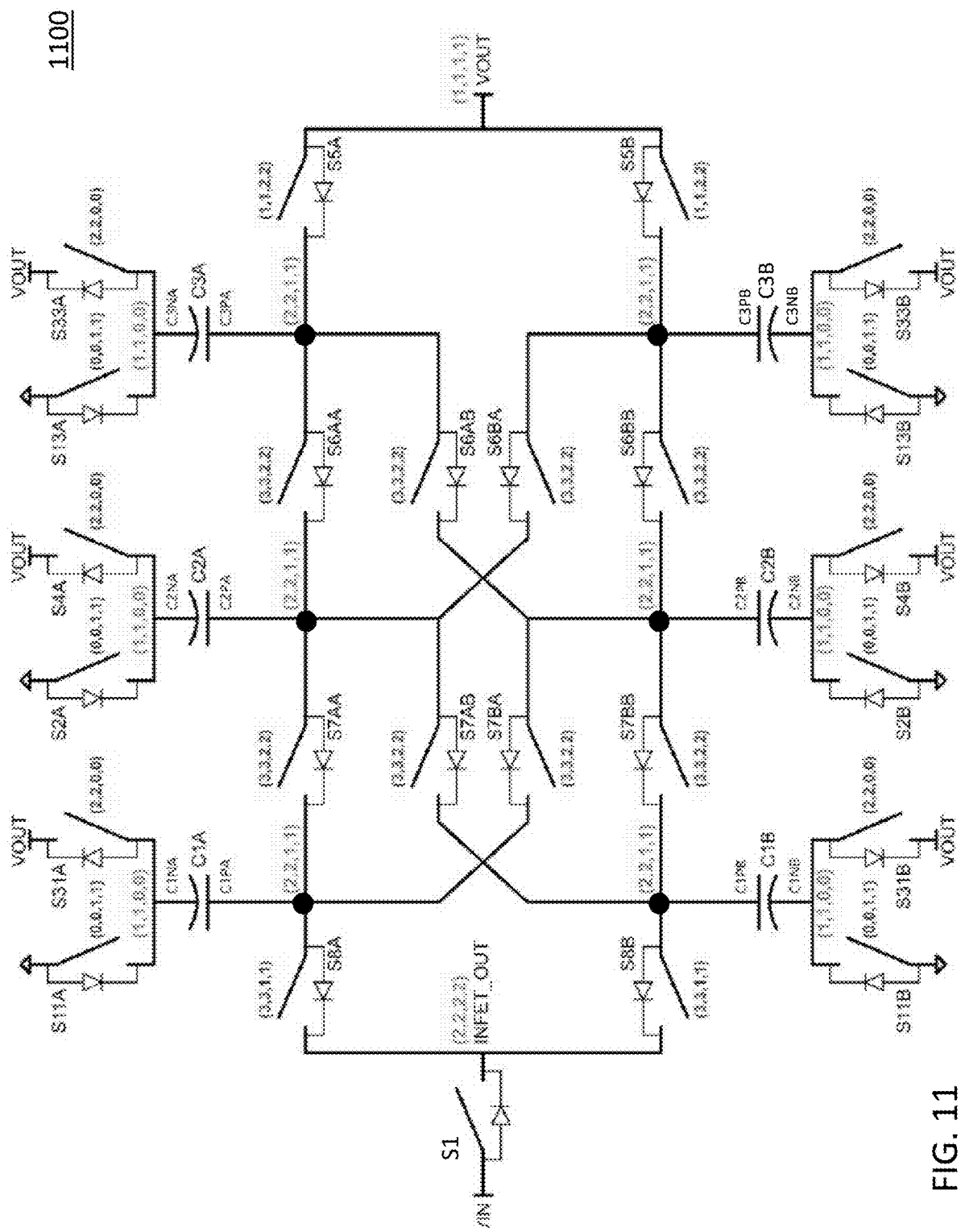
FIG. 11 is an example of a schematic of a 2:1 DC voltage converter in accordance with some embodiments.
Figure 12:
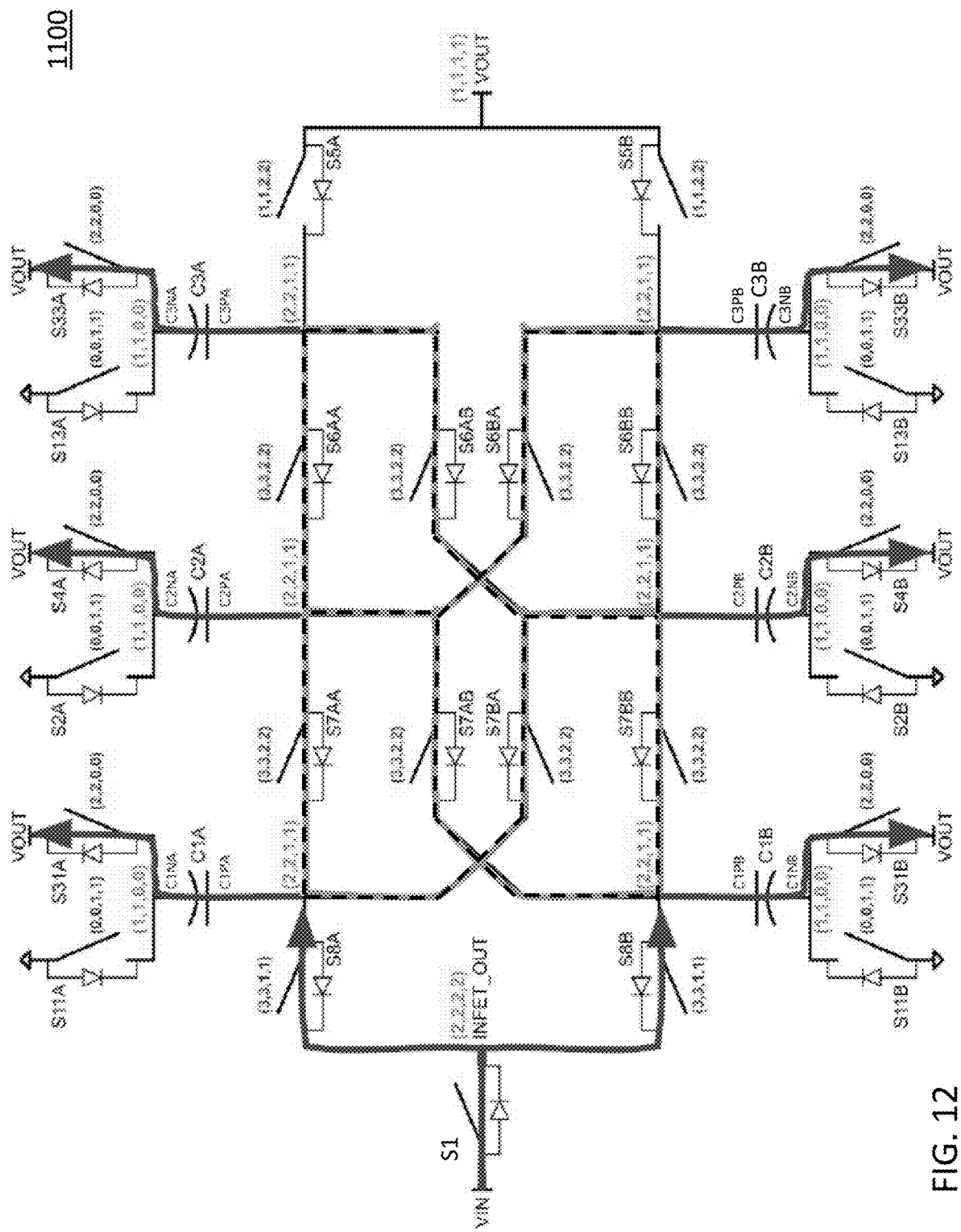
FIG. 12 is an illustration of current flow during a first phase of the operation of the 2:1 DC voltage converter of FIG. 11 in accordance with some embodiments.
Figure 13:
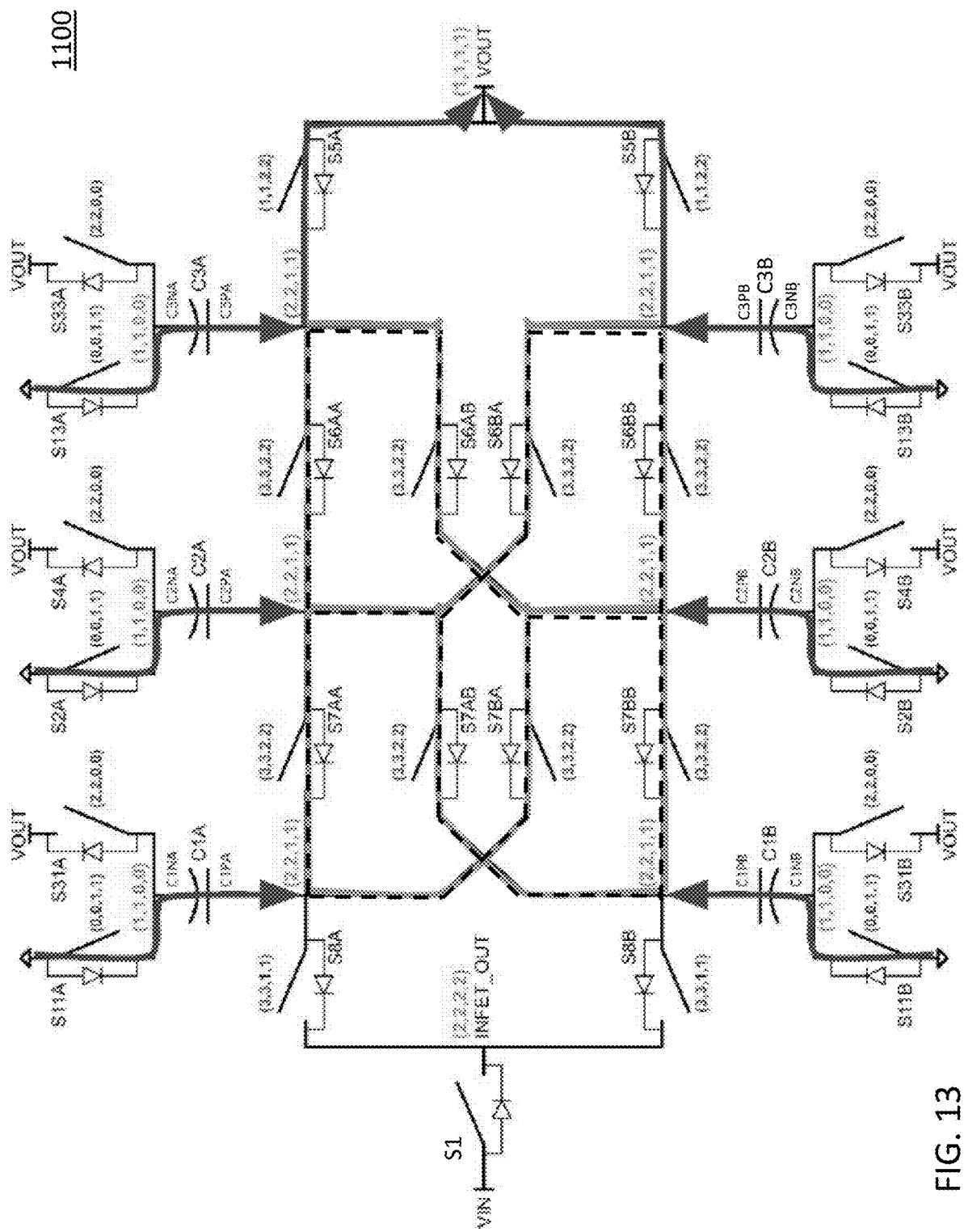
FIG. 13 is an illustration of current flow during a second phase of the operation of the 2:1 DC voltage converter of FIG. 11 in accordance with some embodiments.

Turning to FIGS. 11-13, an example 1100 of a 2:1 DC voltage converter in accordance with some embodiments is illustrated. As shown, like converters 100 and 600, converter 1100 includes switches S1, S11A, S31A, S2A, S4A, S13A, S33A, S8A, S7AA, S6AA, 55A, S7AB, S7BA, S6AB, S6BA, S8B, S7BB, S6BB, S5B, S11B, S31B, S2B, S4B, S13B, and S33B (each of which can have an inherent diode (as shown)) based on the process technology used in some embodiments) and capacitors C1A, C2A, C3A, C1B, C2B, and C3B.

As shown, in some embodiments, circuits 1100, 600, and 100 share the same components. As such, by controlling the states of the switches during the switching phases, a circuit 1100, 600, or 100 can be reconfigured to operate as a 2:1 converter, a 3:1 converter, or a 4:1 converter, respectively, in some embodiments, Any suitable switches can be used as switches S1, S11A, S31A, S2A, S4A, S13A, S33A, S8A, S7AA, S6AA, S5A, S7AB, S7BA, S6AB, S6BA, S8B, S7BB, S6BB, S5B, S11B, S31B, S2B, S4B, S13B, and S33B, and all of these switches need not be of the same type, in some embodiments. For example, in some embodiments, these switches can be formed from N-type MOSFETs or P-type MOSFETs.

S1 can be used to perform a variety of functions in some embodiments. For example, in some embodiments, S1, when on, can be used as a resistor to measure the amount of current flowing from VIN. As another example, S1 can be used to protect the entire converter against certain over voltage or over current events by turning S1 OFF to prevent damage of the converter. In some embodiments, S1 can be omitted when not needed or desirable.

Any suitable capacitors, of any suitable size, can be used as capacitors C1A, C2A, C3A, C1B, C2B, and C3B, and all of these capacitors need not be of the same type or size, in some embodiments. For example, in some embodiments, these capacitors can be formed from Multi-Layer Ceramic Capacitors (MLCC) or on-chip MOS capacitors, and can be in the range of 1 nF to 1 mF, depending on the output power specification (higher output power requires larger capacitance values).

As shown, a voltage input VIN is provided on the left side of the schematic for converter 1100, and seven outputs VOUT are shown along the top, right, and bottom of the schematic for converter 1100. It should be understood that each of the seven outputs VOUT in each of FIGS. 11-13 are connected together.

During operation, converter 1100 can switch sequentially through four phases ρ1-ρ4 (where ρ1 and ρ2 are the same and where ρ3 and ρ4 are the same), for consistency with the operation of converters 100 and 600, or can switch between two phases ρ1 (or ρ2) and ρ3 (or ρ4), in some embodiments. In some embodiments, voltage converter 1100 can switch from phase ρ1 to phase ρ2, from phase ρ2 to phase ρ3, from phase ρ3 to phase ρ4, and from phase ρ4 to phase ρ1 after any suitable period (e.g., in the range of one nanosecond to one millisecond), and these periods between each of these transitions need not be the same. Any given phase (e.g., phase ρ1, ρ2, ρ3, or ρ4) can begin (or end) at any suitable frequency in some embodiments. For example, in some embodiments, this frequency can be in the range of 1 kHz to 1 GHz.

During operation, the switches in converter 1100 can be driven ON or OFF during each of phases ρ1-ρ4 as shown in TABLE 5 below. Any suitable drive signals can be used to control the switches to be ON or OFF during any phase. For example, in some embodiments, when the switches are implemented using N-type MOSFETs, the switches can be driven by drive signals having values equal to the voltage multipliers shown after the colon (":") in TABLE 5 multiplied by the value of VOUT. For example, if VOUT is 1 volt, switch S31A can be driven by a 2 volts DC signal during phase ρ1. As another example, if VOUT is 2 volts, switch S8A can be driven by a 6 volts DC signal during phase ρ2. While specific voltage multipliers are shown in TABLE 5, it should be understood that other voltages are possible in some embodiments.

TABLE 5

| Switch | ρ1 | ρ2 | ρ3 | ρ4 |
|---|---|---|---|---|
| S1 | ON:3 | ON:3 | OFF:3 | OFF:3 |
| S11A | OFF:0 | OFF:0 | ON:1 | ON:1 |
| S31A | ON:2 | ON:2 | OFF:0 | OFF:0 |
| S2A | OFF:0 | OFF:0 | ON:1 | ON:1 |
| S4A | ON:2 | ON:2 | OFF:0 | OFF:0 |
| S13A | OFF:0 | OFF:0 | ON:1 | ON:1 |
| S33A | ON:2 | ON:2 | OFF:0 | OFF:0 |
| S8A | ON:3 | ON:3 | OFF:1 | OFF:1 |
| S7AA | ON:3 | ON:3 | ON:2 | ON:2 |
| S6AA | ON:3 | ON:3 | ON:2 | ON:2 |
| S5A | OFF:1 | OFF:1 | ON:2 | ON:2 |
| S7AB | ON:3 | ON:3 | ON:2 | ON:2 |
| S7BA | ON:3 | ON:3 | ON:2 | ON:2 |
| S6AB | ON:3 | ON:3 | ON:2 | ON:2 |
| S6BA | ON:3 | ON:3 | ON:2 | ON:2 |
| S8B | ON:3 | ON:3 | OFF:1 | OFF:1 |
| S7BB | ON:3 | ON:3 | ON:2 | ON:2 |
| S6BB | ON:3 | ON:3 | ON:2 | ON:2 |
| S5B | OFF:1 | OFF:1 | ON:2 | ON:2 |
| S11B | OFF:0 | OFF:0 | ON:1 | ON:1 |
| S31B | ON:2 | ON:2 | OFF:0 | OFF:0 |
| S2B | OFF:0 | OFF:0 | ON:1 | ON:1 |
| S4B | ON:2 | ON:2 | OFF:0 | OFF:0 |
| S13B | OFF:0 | OFF:0 | ON:1 | ON:1 |
| S33B | ON:2 | ON:2 | OFF:0 | OFF:0 |

TABLE 6 shows example multiples of VOUT that can be observed at the various nodes in converter 1100 during different phases of operation in some embodiments. For example, for a VOUT of 2 volts DC, a voltage of 2 volts DC can be observed during phase ρ1 at node C1NA, in some embodiments. As another example, for a VOUT of 1 volt DC, a voltage of 2 volts DC can be observed during phase ρ1 at node C1PA, in some embodiments. While specific voltage multipliers are shown in TABLE 6, it should be understood that other voltages are possible in some embodiments.

TABLE 6

| Node | ρ1 | ρ2 | ρ3 | ρ4 |
|---|---|---|---|---|
| C1NA | 1 | 1 | 0 | 0 |
| C2NA | 1 | 1 | 0 | 0 |
| C3NA | 1 | 1 | 0 | 0 |
| C1PA | 2 | 2 | 1 | 1 |
| C2PA | 2 | 2 | 1 | 1 |
| C3PA | 2 | 2 | 1 | 1 |
| INFET_OUT | 2 | 2 | 2 | 2 |
| C1PB | 2 | 2 | 1 | 1 |
| C2PB | 2 | 2 | 1 | 1 |
| C3PB | 2 | 2 | 1 | 1 |
| C1NB | 1 | 1 | 0 | 0 |
| C2NB | 1 | 1 | 0 | 0 |
| C3NB | 1 | 1 | 0 | 0 |

Turning to FIGS. 12-13, illustrations of the current flow during each of phases ρ1-ρ4 are shown in accordance with some embodiments. That is, FIG. 12 shows phases ρ1 and ρ2, and FIG. 13 shows phases ρ3 and ρ4. The arrows represent current flowing through closed switches consistent with TABLE 5. Switches with no arrows going through them are open consistent with TABLE 5.

As shown in each of FIGS. 12 and 13 by dashed lines, switches S7AA, S6AA, S7AB, S7BA, S6AB, S6BA, S7BB, and S6BB are ON (closed) during all four operational phases (ρ1, ρ2, ρ3, and ρ4) of converter 1100 as described below. Keeping switches S7AA, S6AA, S7AB, S7BA, S6AB, S6BA, S7BB, and S6BB are ON (closed) during all four operational phases (ρ1, ρ2, ρ3, and ρ4) effectively removes them from converter 1100 during operation. As mentioned above, this allows the circuit of converter 1100 to be used to act as a 2:1 converter, a 3:1 converter, or a 4:1 converter based on which switches in the circuit are active.

As shown in FIG. 12, during phase ρ1 or ρ2, current flows from VIN through S1, through S8A and S8B (in parallel), through S7AA, S7AB, S7BA, S7BB, S6A, S6AB, S6BA, and S6BB, through C1A, C1B, C2A, C2B, C3A, and C3B, and through S31A, S31B, S4A, S4B, S33A, and S33B, to VOUT.

As shown in FIG. 13, during phase ρ3 or ρ4, current flows from ground through switches S11A, S11B, S2A, S2B, S13A, and S13B, through C1A, C1B, C2A, C2B, C3A, and C3B, through S7AA, S7AB, S7BA, S7BB, S6AA, S6AB, S6BA, and S6BB, through S5A and S5B (in parallel), to VOUT.

Figure 14:
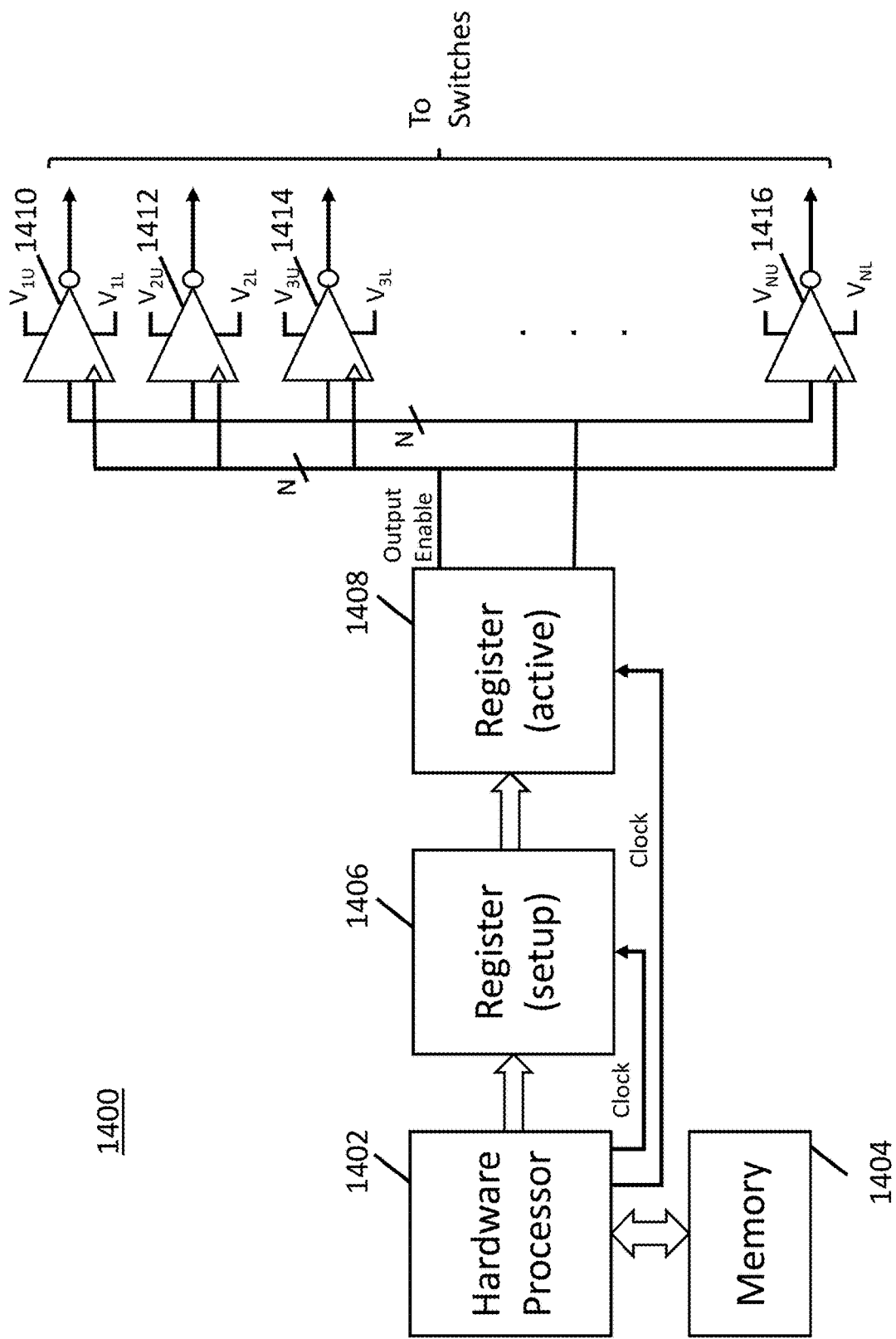
FIG. 14 is an example of a schematic of a circuit for driving switches in accordance with some embodiments.

Turning to FIG. 14, an example 1400 of a circuit for driving switches that can be used in converters 100, 600, and/or 1100 in accordance with some embodiments is shown. As illustrated, circuit 1400 includes a hardware processor 1402, memory 1404, registers 1406 and 1408, and inverters 1410, 1412, 1414, and 1416 in some embodiments.

Hardware processor 1402 can include any suitable hardware processor, such as a microprocessor, a micro-controller, a digital signal processor, dedicated logic, and/or any other suitable circuitry, in some embodiments.

Memory 1404 can be any suitable memory and/or storage for storing data, lookup tables, programs, etc. in some embodiments. For example, memory 1404 can include random access memory, read-only memory, flash memory, hard disk storage, optical media, etc.

Registers 1406 and 1408 can be any suitable devices for storing data in some embodiments. Register 1406 can be used for setting-up how the switches will be configured during the next phase, and register 1408 can be to control how the switches are configured during the current phase.

Inverters 1410, 1412, 1414, and 1416 can be any suitable inverters, and any suitable number (N) of inverters can be used in some embodiments. In some embodiments, rather than using inverters, buffers can be used in their places. In some embodiments, the number of inverters (N) used can be equal to:

$$N = \sum_{i=1}^{M} V_i$$

where M is the total number of switches in a converter; and $V_i$ is the number of different voltage pairs that can be used to control switch i.

For example, consider S7AA. For a converter configured to perform 2:1, 3:1, and 4:1 conversion as illustrated in converters 1100, 600, and 100, respectively, switch S7AA may be controlled by voltages having the following VOUT multipliers: (1) for FIGS. 1-5, multipliers 3, 2, 2, and 4 may be used for phases ρ1, ρ2, ρ3, and ρ4, respectively; (2) for FIGS. 6-10, multipliers 4, 2, 2, and 4 may be used for phases ρ1, ρ2, ρ3, and ρ4, respectively; and (3) for FIGS. 11-13, multipliers 3, 3, 2, and 2 may be used for phases ρ1, ρ2, ρ3, and ρ4, respectively. As such, a first inverter having an upper voltage ($V_{1U}$) of 3*VOUT and a lower voltage ($V_{1L}$) of 2*VOUT and a second inverter having an upper voltage ($V_{1U}$) of 3*VOUT and a lower voltage ($V_{1L}$) of 2*VOUT can be used to control switch S7AA. The outputs of these two inventors can both be connected to the control input (e.g., gate) of the same switch. When either of the first inverter and the second inverter is active, its output is enabled and the other inverters output is disabled.

During operation, in some embodiments, under the control of any suitable instruction, hardware processor 1402 can setup registers 1406 and 1408 to configure the drive voltages for any phase. In other words, the register can be configured to store desired data and output enable signals for the N inverters. When the time comes to switch from one phase to the next, the hardware processor can clock the data and the output enable signals from setup register 1406 to register 1408, which will then control the inverters accordingly.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read-only memory (EPROM), electrically erasable programmable read-only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Figure 15:
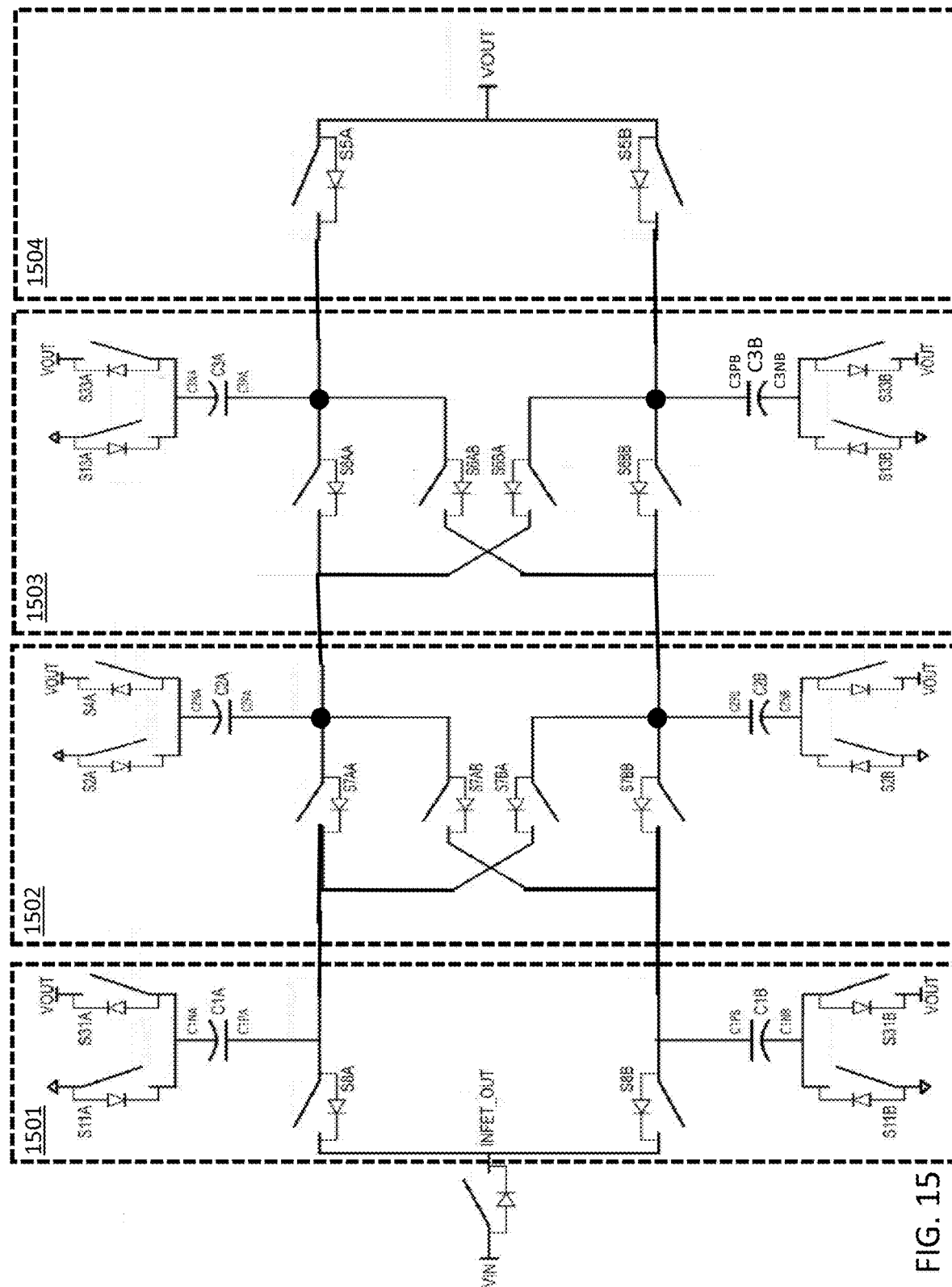
FIG. 15 is an example of a schematic of a 4:1 DC voltage converter showing different blocks of the converter in accordance with some embodiments.

FIG. 15 is an example of a schematic of a 4:1 DC voltage converter showing different blocks of the converter in accordance with some embodiments. As show, FIG. 15 includes blocks 1501, 1502, 1503, and 1504. Block 1501 includes a connection to the input voltage VIN. Block 1504 includes only two switches and a connection to the output voltage VOUT. Blocks 1502 and 1503 include identical components in an identical configuration.

In some embodiments, the circuit of FIG. 15 can be used to provide a 4:1 converter, a 3:1 converter, or a 2:1 converter as described above. In some embodiments, if only a 3:1 converter and a 2:1 converter were needed, either block 1502 or block 1503 could be omitted and the top and bottom connections on the left side of the omitted block could be connected the top and bottom connections, respectively, on the right side of the omitted block. In some embodiments, if a 5:1 converter, a 4:1 converter, a 3:1 converter, and a 2:1 converter was desired, an additional block 1502 or block 1503 could be inserted before block 1502, between blocks 1502 and 1503, or after block 1503. To achieve incrementally higher conversion ratios, increments in the number of blocks 1502/1503 can be used.

Although the invention has been described and illustrated in the foregoing illustrative embodiments, it is understood that the present disclosure has been made only by way of example, and that numerous changes in the details of implementation of the invention can be made without departing from the spirit and scope of the invention, which are limited only by the claims that follow. Features of the disclosed embodiments can be combined and rearranged in various ways.

What is claimed is:
1. A circuit comprising:
   a first block comprising:
      an input node;

a first switch having: a first side connected to the input node; and a second side;

a first capacitor having: a first side connected to the second side of the first switch; and a second side;

a second switch having: a first side connected to the second side of the first capacitor; and a second side connected to a voltage level node;

a third switch having: a first side connected to the second side of the first capacitor; and a second side connected to a voltage output node;

a fourth switch having: a first side connected to the input node; and a second side;

a second capacitor having: a first side connected to the second side of the fourth switch; and a second side;

a fifth switch having: a first side connected to the second side of the second capacitor; and a second side connected to the voltage level node;

a sixth switch having: a first side connected to the second side of the second capacitor; and a second side connected to the voltage output node;

a first connection node connected to the first side of the first capacitor; and a second connection node connected to the first side of the second capacitor;

a second block comprising:

a third connection node connected to the first connection node;

a fourth connection node connected to the second connection node;

a seventh switch having: a first side connected to the third connection node; and a second side;

a third capacitor having: a first side connected to the second side of the seventh switch; and a second side;

an eighth switch having: a first side connected to the second side of the third capacitor; and a second side connected to the voltage level node;

a ninth switch having: a first side connected to the second side of the third capacitor; and a second side connected to the voltage output node;

a tenth switch having: a first side connected to the fourth connection node; and second side;

a fourth capacitor having: a first side connected to the second side of the tenth switch; and a second side;

an eleventh switch having: a first side connected to the second side of the fourth capacitor; and a second side connected to the voltage level node;

a twelfth switch having: a first side connected to the second side of the fourth capacitor; and a second side connected to the voltage output node;

a thirteenth switch having: a first side connected to the first side of the tenth switch; and a second side connected to the second side of the seventh switch;

a fourteenth switch having: a first side connected to the first side of the seventh switch; and a second side connected to the second side of the tenth switch;

a fifth connection node connected to the first side of the third capacitor; and a sixth connection node connected to the first side of the fourth capacitor;

a third block comprising:

a fifteenth switch having: a first side coupled to the fifth connection node; and a second side connected to the voltage output node; and a sixteenth switch having: a first side coupled to the sixth connection node; and a second side connected to the voltage output node.

2. The circuit of claim 1, wherein the first side of the fifteenth switch is coupled to the fifth connection node by a first connection; and the first side of the sixteenth switch is coupled to the sixth connection node by a second connection.

3. The circuit of claim 1, further comprising:

a fourth block comprising:

a seventh connection node connected to the fifth connection node;

a eighth connection node connected to the sixth connection node;

a seventeenth switch having: a first side connected to the seventh connection node; and a second side;

a fifth capacitor having: a first side connected to the second side of the seventeenth switch; and a second side;

an eighteenth switch having: a first side connected to the second side of the fifth capacitor; and a second side connected to the voltage level node;

a nineteenth switch having: a first side connected to the second side of the fifth capacitor; and a second side connected to the voltage output node;

a twentieth switch having: a first side connected to the eighth connection node; and second side;

a sixth capacitor having: a first side connected to the second side of the twentieth switch; and a second side;

a twenty-first switch having: a first side connected to the second side of the sixth capacitor; and a second side connected to the voltage level node;

a twenty-second switch having: a first side connected to the second side of the sixth capacitor; and a second side connected to the voltage output node;

a twenty-third switch having: a first side connected to the first side of the twentieth switch; and a second side connected to the second side of the seventeenth switch;

a twenty-fourth switch having: a first side connected to the first side of the seventeenth switch; and a second side connected to the second side of the twentieth switch;

a ninth connection node connected to the first side of the fifth capacitor and to the first side of the fifteenth switch; and a tenth connection node connected to the first side of the sixth capacitor and to the first side of the sixteenth switch.

\* \* \* \* \*